(12) United States Patent
Gu et al.

(10) Patent No.: US 10,127,067 B2
(45) Date of Patent: Nov. 13, 2018

(54) METHOD AND COMPUTING DEVICE FOR SELECTING PROTOCOL STACK FOR VIRTUAL MACHINES

(71) Applicant: Huawei Technologies Co., Ltd., Shenzhen (CN)

(72) Inventors: Qiang Gu, Beijing (CN); Liufei Wen, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 138 days.

(21) Appl. No.: 15/139,724

(22) Filed: Apr. 27, 2016

(65) Prior Publication Data
US 2016/0239337 A1 Aug. 18, 2016

Related U.S. Application Data

(63) Continuation of application No. PCT/CN2014/088435, filed on Oct. 13, 2014.

(30) Foreign Application Priority Data

Oct. 29, 2013 (CN) .......................... 2013 1 0522423

(51) Int. Cl.
*G06F 9/455* (2018.01)
*H04L 12/931* (2013.01)
(Continued)

(52) U.S. Cl.
CPC .......... *G06F 9/45558* (2013.01); *G06F 9/544* (2013.01); *H04L 49/70* (2013.01);
(Continued)

(58) Field of Classification Search
None
See application file for complete search history.

(56) References Cited

U.S. PATENT DOCUMENTS 7,424,710 B1  9/2008 Nelson et al.
8,849,972 B2 * 9/2014 Tsym .................. H04L 67/1008
                                                709/223
(Continued)

FOREIGN PATENT DOCUMENTS

CN  101356783 A  1/2009
CN  101667144 A  3/2010
(Continued)

OTHER PUBLICATIONS

Machine Translation and Abstract of Chinese Publication No. CN101667144, dated Mar. 10, 2010, 11 pages.
(Continued)

*Primary Examiner* — Eric C Wai
(74) *Attorney, Agent, or Firm* — Conley Rose, P.C.

(57) ABSTRACT

A method and computing device for selecting a protocol stack for performing protocol processing on data is presented. The computing device is configured with a hypervisor for managing a first virtual machine. According to the method, when a socket creation instruction sent by the first virtual machine is received, a protocol stack instance is selected from the protocol stack instances provided by the computing device. Then, a socket is created in the selected protocol stack instance according to the socket creation instruction; and a creation result is transmitted to the first virtual machine. Therefore, in a virtualized environment, multiple virtual machines disposed in a same computing device can share a network protocol processing capability, and protocol stacks of the virtual machines achieve load balance.

15 Claims, 8 Drawing Sheets

(51) Int. Cl.
    *G06F 9/54*         (2006.01)
    *H04L 29/06*     (2006.01)
    *H04L 29/08*     (2006.01)

(52) U.S. Cl.
    CPC .... *G06F 2009/45562* (2013.01); *H04L 69/12* (2013.01); *H04L 69/321* (2013.01)

(56) References Cited

U.S. PATENT DOCUMENTS

| | | |
|---|---|---|
| 2005/0276281 A1 | 12/2005 | Jones et al. |
| 2007/0162619 A1 | 7/2007 | Aloni et al. |
| 2008/0184273 A1 | 7/2008 | Sekar |
| 2009/0083756 A1 | 3/2009 | Kim et al. |
| 2009/0323691 A1 | 12/2009 | Johnson et al. |
| 2010/0131636 A1 | 5/2010 | Sun et al. |
| 2010/0217916 A1 | 8/2010 | Gao et al. |
| 2012/0084774 A1 | 4/2012 | Post et al. |
| 2012/0210318 A1 | 8/2012 | Sanghvi et al. |
| 2013/0081014 A1 | 3/2013 | Kadatch et al. |
| 2014/0337843 A1* | 11/2014 | Delamare .............. H04B 3/542 718/1 |

FOREIGN PATENT DOCUMENTS

| | | |
|---|---|---|
| CN | 101819564 A | 9/2010 |
| CN | 102402462 A | 4/2012 |
| CN | 102664786 A | 9/2012 |

OTHER PUBLICATIONS

Foreign Communication From A Counterpart Application, Chinese Application No. 201310522423.5, Chinese Office Action dated Apr. 27, 2017, 9 pages.

Foreign Communication From A Counterpart Application, European Application No. 14858645.6, Extended European Search Report dated Sep. 27, 2016, 11 pages.

Foreign Communication From A Counterpart Application, PCT Application No. PCT/CN2014/088435, English Translation of International Search Report dated Jan. 13, 2015, 2 pages.

Foreign Communication From A Counterpart Application, PCT Application No. PCT/CN2014/088435, English Translation of Written Opinion dated Jan. 13, 2015, 6 pages.

\* cited by examiner

METHOD AND COMPUTING DEVICE FOR SELECTING PROTOCOL STACK FOR VIRTUAL MACHINES

CROSS-REFERENCE TO RELATED APPLICATIONS

This application is a continuation of International Application No. PCT/CN2014/088435, filed on Oct. 13, 2014, which claims priority to Chinese Patent Application No. 201310522423.5, filed on Oct. 29, 2013, both of which are hereby incorporated by reference in their entireties.

TECHNICAL FIELD

The present disclosure relates to the field of computer technologies, and in particular, to a method, an apparatus, and a device for selecting a protocol stack.

BACKGROUND

In the field of computer technologies, a virtualization technology is a technology for combining or dividing existing computer resources so that the resources are represented as one or multiple operating environments, thereby providing an access mode better than that of an original resource configuration.

As shown in FIG. 1, a virtualized environment mainly includes a virtual machine (VM) and a Hypervisor. The virtualized environment is based on a physical environment. That is, to implement the virtualization technology, a physical host needs to provide a basis for running the virtualized environment. The virtual machine is a complete software-simulated computer system. It has complete hardware system functions and runs in a virtualized environment. In the virtualized environment, the hypervisor is configured to manage the virtual machine, and forward data transmitted by the virtual machine, where forwarding data transmitted by the virtual machine may be implemented by a virtual switch in the hypervisor, as shown by a solid-line transmission path shown in FIG. 1. During data processing of the virtual machine, including socket creation and protocol processing, data after protocol processing is transmitted to the virtual switch through a virtual network interface card (Virtual NIC) and transmitted to a physical network interface card through the virtual switch. Forwarding data transmitted by the virtual machine may also be that the virtual network interface card directly transmits processed data to the physical network interface card, as shown by a dashed-line transmission path in FIG. 1.

In the virtualized environment, a protocol processing function is generally set in the virtual machine and is referred to as a protocol stack in the virtual machine. Because virtual machines are isolated from each other, protocol stacks in the virtual machines are also isolated from each other and cannot be shared. That is, a protocol stack in virtual machine A cannot serve virtual machine B. In addition, due to isolation of the virtual machines, the virtual machines cannot share a network processing capability of a same physical host. Therefore, in this case, due to mutual isolation of the protocol stacks in the virtual machines, load imbalance of the protocol stacks leads to a poor protocol processing capability, and a protocol stack having a poor protocol processing capability may become a bottleneck of a corresponding virtual machine. For example, as shown in FIG. 1, during data processing, protocol stack A in virtual machine #1 bears extremely heavy load and is already 100% fully loaded, while protocol stack B in virtual machine #2 is 50% loaded, and protocol stack C in virtual machine #3 is 10% loaded. However, during protocol processing, protocol stack A cannot use a protocol processing capability provided by protocol stack C or protocol stack B. After data is allocated to protocol stack A, protocol stack A can only run in an overloaded state to perform protocol processing or cannot perform protocol processing.

In conclusion, in the virtualized environment, when processing data, multiple virtual machines cannot share a network protocol processing capability of a physical host, and in a case in which protocol stacks of some virtual machines are heavily loaded, system reliability is poor.

SUMMARY

The present disclosure provides a method and a system for selecting a protocol stack, so that multiple virtual machines disposed on a same physical host can share a network protocol processing capability, and that protocol stack load of the virtual machines is balanced, which improves system reliability.

According to a first aspect, a method performed by a computing device hosting a first virtual machine is provided. The computing device is configured with a hypervisor for managing the first virtual machine. According to the method, after receiving a socket creation instruction sent by the first virtual machine, the computing device selects a protocol stack instance from a plurality of protocol stack instances provided by the computing device. Then, the computing device creates a socket in the selected protocol stack instance according to the socket creation instruction and sends a correspondence between the created socket and an identifier of the protocol stack instance to the first virtual machine. Further, the computing device performs, according to the correspondence, data processing based on the created socket in the selected protocol stack instance for the first virtual machine.

In the technical solutions provided by the present disclosure, protocol stack instances are created in a computing device. When a socket creation instruction sent by the first virtual machine is received, a protocol stack instance is selected from the protocol stack instances provided by the computing device. Then, a socket is created in the selected protocol stack instance according to the socket creation instruction, and a creation result is transmitted to the first virtual machine. Therefore, in a virtualized environment, multiple virtual machines disposed in a same computing device can share a network protocol processing capability, and protocol stacks of the virtual machines achieve load balance, which improves system reliability.

DESCRIPTION OF EMBODIMENTS

In the prior art, when data is processed in a virtualized environment, because multiple virtual machines cannot share a network protocol processing capability of a host, system reliability is poor in a case in which protocol stacks of some virtual machines are heavily loaded. In view of this problem, in technical solutions provided by the present disclosure, protocol stack instances are created in a host; when a socket creation instruction for creating a socket is received, a protocol stack instance is selected from the protocol stack instances of the host; then the socket is created in the selected protocol stack instance according to the socket creation instruction, and a creation result is transmitted to a virtual machine. Therefore, in a virtualized environment, multiple virtual machines disposed in a same host can share a network protocol processing capability, and protocol stacks of the virtual machines achieve load balance, which improves system reliability.

Main implementation principles and specific implementation manners of the technical solutions of the embodiments of the present disclosure, and corresponding beneficial effects that can be achieved thereby are described in the following in detail with reference to the accompanying drawings.

Embodiment 1

Embodiment 1 of the present disclosure provides a system for selecting a protocol stack. A structure of the system may be any one of structures shown in FIG. 2A, FIG. 2B, and FIG. 2C. The following describes the three different structures of the system separately.

Figure 2A:
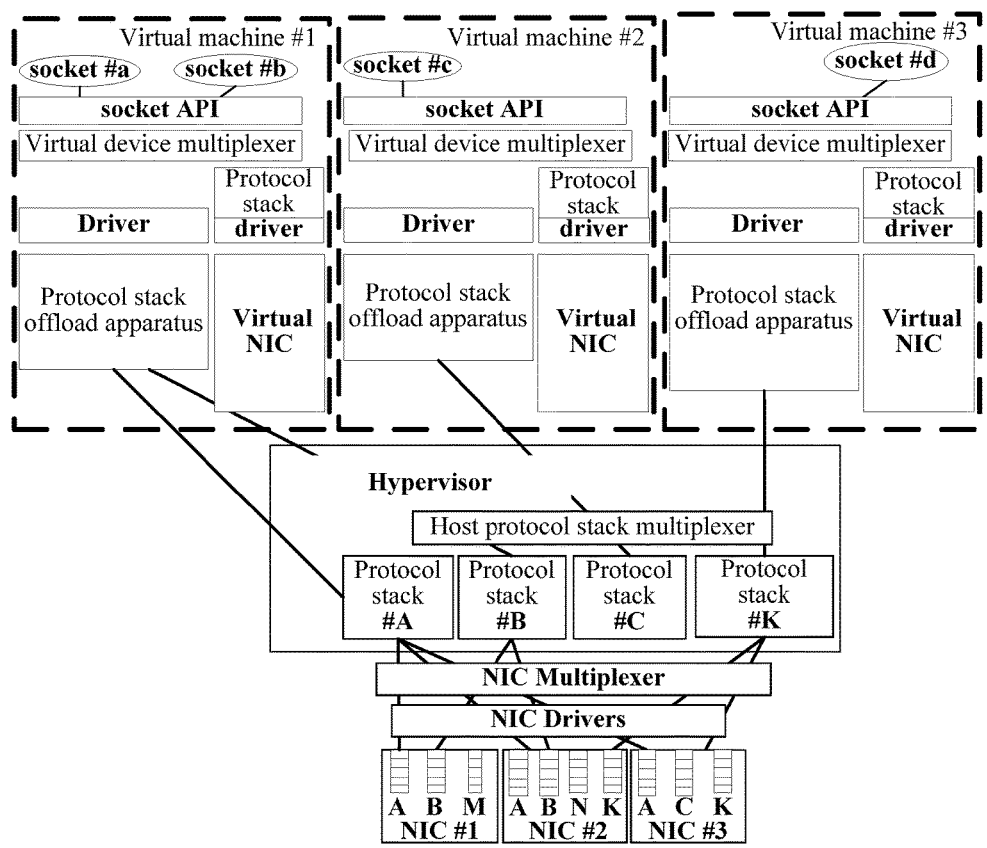
FIG. 2A is a schematic diagram of a structure of a system for selecting a protocol stack, where the system includes a virtual device multiplexer in a virtualized environment according to Embodiment 1 of the present disclosure.

As shown in FIG. 2A, which is a schematic diagram of a first structure of a system for selecting a protocol stack in a virtualized environment according to Embodiment 1 of the present disclosure, the system includes a host (not definitely shown in FIG. 2A), at least one virtual machine disposed in the host, a hypervisor disposed in the host and configured to manage the virtual machine, at least one protocol stack instance disposed in the host and configured to provide a protocol processing function, a NIC multiplexer disposed in the host and configured to manage and allocate a NIC, and a NIC driver configured to drive the NIC.

The host may be a personal computer (PC), a server, a portable computer, or the like. The host is configured to provide a hardware environment for creation and running of a virtual machine.

Figure 1:
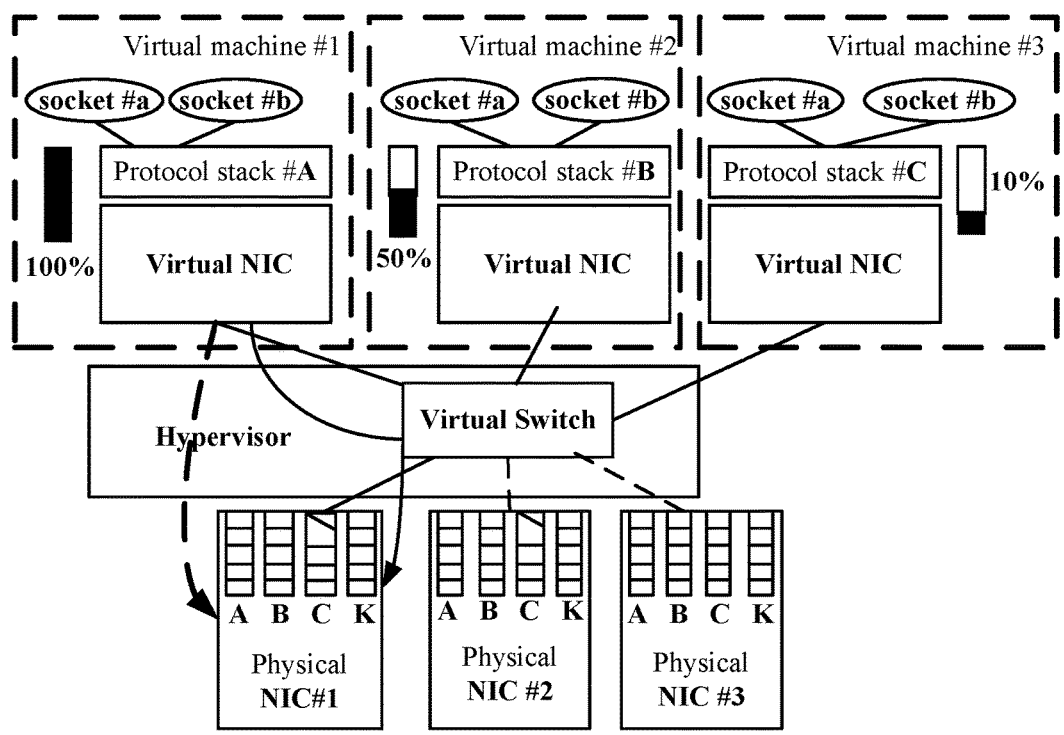
FIG. 1 is a schematic diagram of a structure of a system for selecting a protocol stack in a virtualized environment according to the prior art.

One or more virtual machines may be disposed in a host. If multiple virtual machines are disposed in a host, the disposed multiple virtual machines may perform communication with each other through a virtual switch. A system structure shown in FIG. 1 and a system structure shown in FIG. 2C both include a virtual switch. In all the three different system structures provided by Embodiment 1 of the present disclosure, an example in which three virtual machines are disposed in a host is used for detailed description. The virtual machines are virtual machine #1, virtual machine #2, and virtual machine #3 shown in FIG. 2A, FIG. 2B, and FIG. 2C. For any virtual machine in the virtual machines included in the host, when the virtual machine includes created sockets which are socket #a, socket #b, socket #c, and socket #d shown in FIG. 2A, FIG. 2B, and FIG. 2C. Each virtual machine may include at least one created socket. The created socket corresponds to a socket application programming interface (API). Each virtual machine further includes at least one protocol stack used for providing a protocol processing function and a virtual NIC used for data transmission.

In the first system structure provided by Embodiment 1 of the present disclosure, a virtual device multiplexer configured to select a virtual device when protocol processing is performed on data, is further disposed in a virtual machine. In contrast to FIG. 1, it can be known that in the virtual machine, a protocol stack offload apparatus and a driver corresponding to the protocol stack offload apparatus are further added. The protocol stack offload apparatus is configured to directly send data without any protocol processing to the hypervisor, and a protocol stack instance in the hypervisor performs protocol processing on the data.

The system structure provided by Embodiment 1 of the present disclosure further includes a hypervisor configured to manage and schedule a virtual machine in the host. In the hypervisor, a host protocol stack multiplexer is disposed and configured to manage and schedule at least one protocol stack instance disposed in the hypervisor. Each protocol stack instance in the protocol stack instances disposed in the hypervisor may provide a protocol processing function for only one virtual machine, or may provide a protocol processing function for multiple virtual machines. That is, each protocol stack instance disposed in the host may provide a service for only one virtual machine, or may be shared and used by multiple virtual machines.

A correspondence between a protocol stack instance and a virtual machine in the host may be set and maintained by the host protocol stack multiplexer. Each protocol stack instance disposed in the host may correspond to a queue in one or more NICs as required, where a correspondence may be configured and maintained by a NIC multiplexer.

Figure 2B:
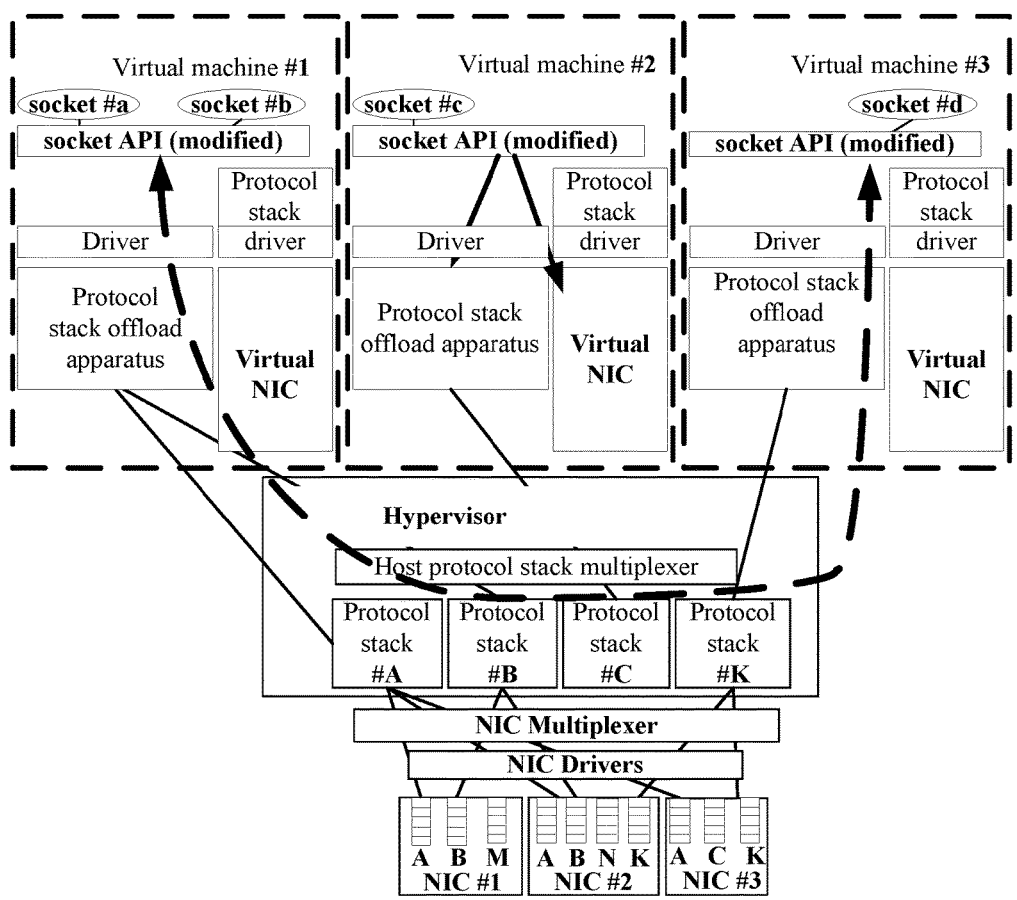
FIG. 2B is a schematic diagram of a structure of a system for selecting a protocol stack, where the system does not include a virtual device multiplexer in a virtualized environment according to Embodiment 1 of the present disclosure.

FIG. 2B shows a second system structure provided by Embodiment 1 of the present disclosure. In contrast to FIG. 2A, it can be known that in the system structure shown in FIG. 2B, no virtual device multiplexer is disposed in a virtual machine, and a function of the virtual device multiplexer may be implemented using a socket API. Other components are the same as those shown in FIG. 2A. Details are omitted herein.

Figure 2C:
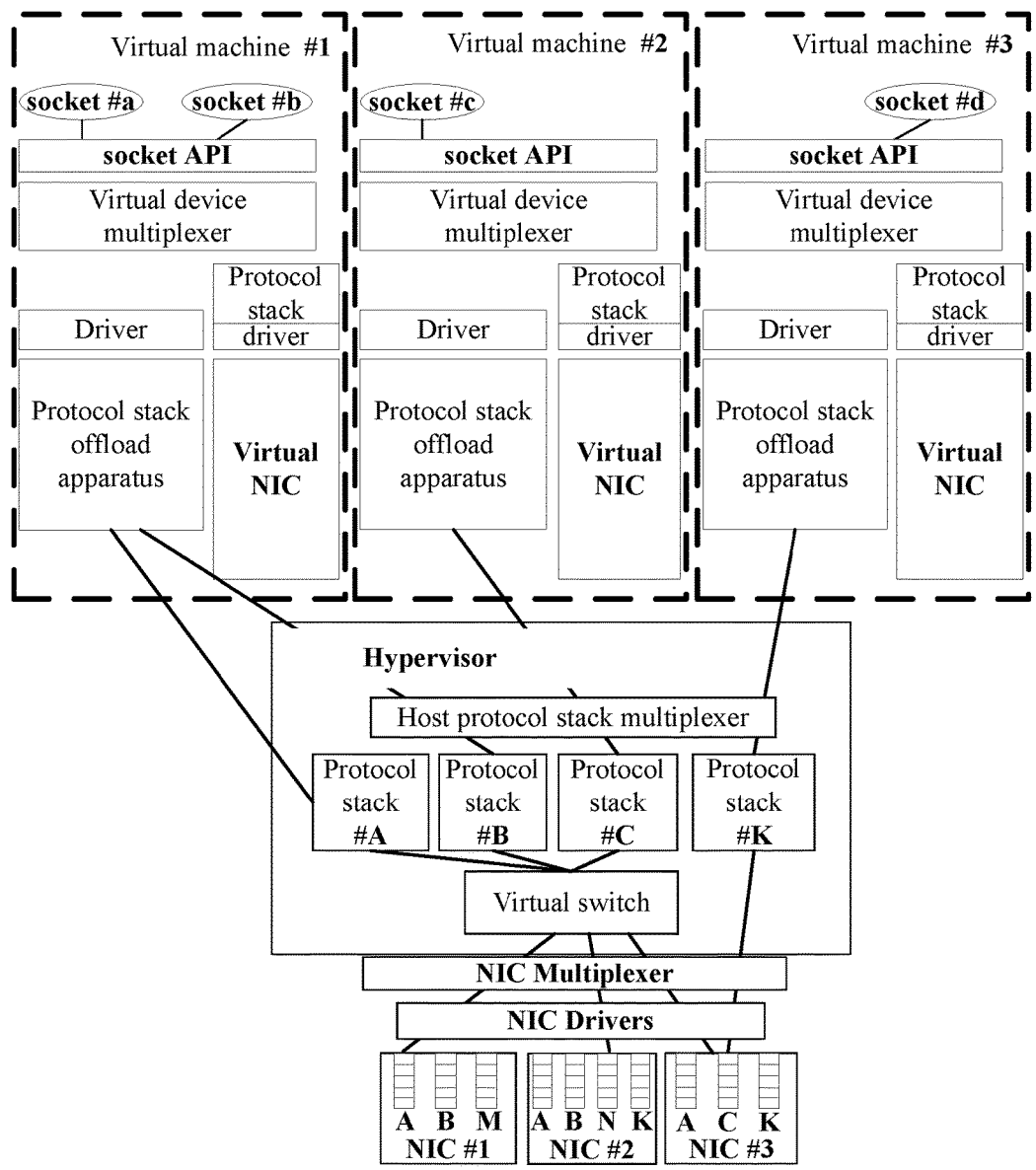
FIG. 2C is a schematic diagram of a structure of a system for selecting a protocol stack, where the system includes a virtual device multiplexer and a virtual switch in a virtualized environment according to Embodiment 1 of the present disclosure.

FIG. 2C shows a third system structure provided by Embodiment 1 of the present disclosure. In contrast to FIG. 2A, it can be known that in the system structure shown in FIG. 2C, a virtual switch is added, where the virtual switch may implement mutual communication between virtual machines in a same host. Other components are the same. Details are omitted herein.

It can be known from the above that in the system structures shown in FIG. 2A to FIG. 2C, components are basically the same. Therefore, in Embodiment 1 of the present disclosure, the system structure shown in FIG. 2A is used to further describe in detail the technical solution provided by the embodiment of the present disclosure.

A protocol stack instance may be created beforehand in a hypervisor of the host. A cluster including multiple protocol stack instances may be referred to as a protocol stack instance cluster. After the protocol stack instance is created in the host, an identifier of the created protocol stack instance may be sent to the host protocol stack multiplexer. The host protocol stack multiplexer stores the identifier of the created protocol stack instance. The identifier of the protocol stack instance stored in the host protocol stack multiplexer is a number that can uniquely identify the protocol stack instance. The number may be a sequence number of the created protocol stack instance, or may be a combination of a virtual machine identifier and the sequence number of the created protocol stack instance.

In data processing of a virtual machine, a socket creation process, a process of a control operation on a created socket, and a data transmission process are mainly included. The processes are described separately in the following.

An application in the virtual machine invokes a socket API to create a socket, and the virtual machine sends a socket creation instruction for socket creation. The socket creation instruction includes information about socket creation. The information about socket creation includes a local Internet Protocol (IP) address, a local port number, a protocol type, and the like. The information may further include a remote IP address, a remote port number, and the like. When the information about the socket includes only three types of information: the local IP address, the local port number, and the protocol type, the information may be referred to as triplet information of the socket. When the information about the socket includes not only three types of information: the local IP address, the local port number, and the protocol type, but also the remote IP address and the remote port number, the information may be referred to as quintet information of the socket.

The virtual device multiplexer in the virtual machine receives the socket creation instruction, and sends the socket creation instruction to the host protocol stack multiplexer.

Optionally, when the socket creation instruction sent by the virtual machine is received, it may be further determined whether a virtual device used for data transmission is a virtual network interface card. If it is determined that the virtual device used for data transmission is not a virtual network interface card, the socket creation instruction is sent to the stack offload device in the virtual machine and the driver of the protocol stack offload apparatus. The protocol stack offload apparatus in the virtual machine and the driver of the protocol stack offload apparatus receive the socket creation instruction, and send the received socket creation instruction to the host protocol stack multiplexer in the host.

It may be determined, according to at least one of the following manners, whether the virtual device used for data transmission is a virtual NIC.

First manner includes determine, according to a static designation manner, whether the virtual device used for data transmission is a virtual NIC.

In this manner, because it is a static designation manner, if the statically designated virtual device used for data transmission is not a virtual NIC, even if a virtual NIC exists in the system, the virtual NIC is always not selected for data transmission, but the protocol stack offload apparatus and the driver are selected for data transmission.

Second manner includes determine an application process corresponding to the socket to be created according to the socket creation instruction, determine a service feature of the application process according to historical information about socket creation of the application process, and determine, according to the service feature of the application process, whether the virtual device used for data transmission is a virtual NIC.

In this manner, if another socket created previously and coming from an application process of a socket (for example, an entity that creates a socket in the virtual machine) has a feature, for example, long connection duration and high service throughput, a policy may be set according to the type of factor that may represent the service feature, and it may be determined, according to the policy, whether to select a virtual NIC. A virtual NIC is selected if a socket newly created comes from application process 1 having high throughput.

Third manner includes determine, according to attribute information of the socket to be created according to the socket creation instruction, whether the virtual device used for data transmission is a virtual NIC.

The attribute information of the socket includes triplet information of the socket or quintet information of the socket. In this manner, it may be determined, according to all or some information in the triplet information (the local IP address, the local port number, and the protocol type) or quintet information (the local IP address, the local port number, the remote IP address, the remote port number, and the protocol type) included in the socket to be created, using a rule match manner (for example, if the local port number is within a range of 8000-10000, the remote port number is 80, and the protocol type is Transmission Control Protocol (TCP), processing is performed by a virtual network interface card), whether to select a virtual NIC.

When receiving the socket creation instruction, the host protocol stack multiplexer selects a protocol stack instance from at least one protocol stack instance of the host.

The protocol stack instance disposed in the host has a protocol processing function. A protocol stack instance may be selected from at least one protocol stack instance of the host according to at least one of the following manners.

First manner includes select a protocol stack instance from at least one protocol stack instance of the host according to a load balance principle.

In this manner, it is necessary to know a load status of each protocol stack instance of the host. For example, a protocol stack instance having low load may be selected according to the load status.

Second manner includes determine an application process corresponding to the socket to be created according to the socket creation instruction, determine a service feature of the application process according to historical information about socket creation of the application process, and select a protocol stack instance from at least one protocol stack instance of the host according to the service feature of the application process.

In this manner, if another socket created previously and coming from a virtual machine has a feature, for example, long connection duration and high service throughput, a policy may be set according to the type of factor that may represent the service feature (for example, if a socket newly created comes from virtual machine 1 having high throughput, protocol stack instance 2 is selected), and one protocol stack instance is selected according to the policy.

Third manner includes select a protocol stack instance from at least one protocol stack instance of the host according to a prestored correspondence between a virtual machine identifier and a protocol stack instance identifier using a static designation manner.

In this manner, when a protocol stack instance is created in the host beforehand, after creation of the protocol stack instance is completed, the host protocol stack multiplexer may prestore a correspondence between an identifier of the created protocol stack instance and a virtual machine identifier. In addition, if a same protocol stack instance is shared by multiple virtual machines, the host protocol stack multiplexer may store a correspondence between an identifier of the protocol stack instance and virtual machine identifiers. Subsequently, a protocol stack instance may be selected from the protocol stack instances of the host according to the stored correspondence using the static designation manner.

An example is used for detailed description. As shown in FIG. 2A, it is assumed that the host has four protocol stack instances in total, which are protocol stack instance #A, protocol stack instance #B, protocol stack instance #C, and protocol stack instance #K. In the host protocol stack multiplexer, a stored correspondence between a virtual machine identifier and a protocol stack instance identifier is as follows:

protocol stack instance #A -------------- virtual machine #1 and virtual machine #2;

protocol stack instance #B -------------- virtual machine #1;

protocol stack instance #C -------------- virtual machine #2 and virtual machine #3; and protocol stack instance #K -------------- virtual machine #1, virtual machine #2, and virtual machine #3.

Protocol stack instance #A provides a service for both virtual machine #1 and virtual machine #2. Protocol stack instance #B provides a service for only virtual machine #1. Protocol stack instance #C provides a service for both virtual machine #2 and virtual machine #3. Protocol stack instance #K provides a service for all of virtual machine #1, virtual machine #2, and virtual machine #3. According to the third manner, namely, the static designation manner, the host protocol stack multiplexer may allocate a protocol stack instance according to the stored correspondence.

Fourth manner includes select a protocol stack instance from at least one protocol stack instance of the host according to attribute information of the socket to be created according to the socket creation instruction.

The four manners may be used in combination. For example, several protocol stack instances may be selected from protocol stack instances according to triplet information of the socket, and then a protocol stack instance is selected from several protocol stack instances according to a load balance manner. Alternatively, comprehensively considering the attribute information and service feature of the socket, the information may be mapped in a manner such as hash, and a protocol stack instance is selected from protocol stack instances according to a mapping result.

After a protocol stack instance is selected, the socket is created in the selected protocol stack instance according to the socket creation instruction, and a correspondence between the created socket and an identifier of the protocol stack instance in which the socket is created is transmitted to the virtual machine that sends the socket creation instruction, so that the virtual machine performs, according to the received correspondence, data processing based on the created socket in the selected protocol stack instance.

For example, after creation of the socket is completed, the correspondence between the created socket and the identifier of the protocol stack instance in which the socket is created is sent to the host protocol stack multiplexer. The host protocol stack multiplexer maintains the received correspondence between the created socket and the identifier of the protocol stack instance in which the socket is created, and sends the correspondence between the created socket and the identifier of the protocol stack instance in which the socket is created to the protocol stack offload apparatus that sends the socket creation instruction and to the driver of the protocol stack offload apparatus; the protocol stack offload apparatus and the driver of the protocol stack offload apparatus transmit a socket creation result to the virtual device multiplexer in the virtual machine.

The virtual device multiplexer receives the socket creation result, maintains the correspondence between the created socket and the identifier of the protocol stack instance in which the socket is created, and feeds back the creation result to an application in the virtual machine.

The foregoing socket creation process is implemented on a premise that it is determined that the virtual device used for data transmission is not a virtual network interface card. When it is determined that the virtual device used for data transmission is a virtual network interface card, a socket creation process is as follows.

When a socket creation instruction sent by the virtual machine, for creating a socket, is received, if it is determined that the virtual device used for data transmission is a virtual NIC, the socket is created, according to the socket creation instruction, in the protocol stack instance of the virtual machine corresponding to the virtual NIC. The correspondence between the socket and the identifier of the protocol stack instance that creates the socket is stored, so that the virtual machine performs, according to the stored correspondence, data processing based on the created socket in the protocol stack instance.

Likewise, after the protocol stack instance in the virtual machine completes creation of the socket, the protocol stack instance sends a creation result to the virtual device multiplexer in the virtual machine. The virtual device multiplexer receives the socket creation result, maintains the correspondence between the created socket and the identifier of the protocol stack instance that creates the socket, and feeds back the creation result to an application in the virtual machine.

An exemplary implementation manner of determining whether the virtual device used for data transmission of a user is a virtual NIC is not further described herein. For details, reference may be made to the foregoing detailed description.

In the foregoing socket creation process, in a virtualized environment, when a protocol stack in a virtual machine of the host is heavily loaded, the protocol stack may be associated with multiple protocol stack instances of the host simultaneously. Therefore, the socket creation process may be completed by a protocol stack instance of the host, and multiple virtual machines may share a network protocol processing capability of the host, thereby avoiding a problem of poor system reliability when the protocol stack in the virtual machine becomes a bottleneck of the virtual machine in a case of heavy load of the protocol stack in the virtual machine. In addition, the protocol stack instance of the host may use a signal processor in the host to directly perform protocol processing to avoid a performance loss caused by signal processor simulation, device simulation, and the like.

In the data processing of the virtual machine, a process of performing a control operation on the created socket is further included. Control operations include operations such as bind, listen, connect, and close, and may further include data receiving and data sending operations such as receive and send.

The socket creation process includes two manners: one is the foregoing socket creation method provided by Embodiment 1 of the present disclosure, and the other is creating a socket in the prior art, that is, not using the foregoing socket creation method provided by Embodiment 1 of the present disclosure. Based on this, the process of performing a control operation on the created socket may also include two manners: one is a process of performing a control operation on the foregoing socket created in Embodiment 1 of the present disclosure, and the other is performing a control operation on the socket created in the prior art. The two manners are described separately in the following.

First manner includes a process of performing a control operation on the created socket, which is provided by Embodiment 1 of the present disclosure.

If the virtual machine receives a control instruction for performing a control operation on the socket, the protocol stack instance corresponding to the protocol stack instance identifier corresponding to the socket in the control instruction is determined according to the correspondence between the socket and the identifier of the protocol stack instance that creates the socket, and the operation is performed on the socket in the determined protocol stack instance according to the control instruction; and an operation result of the operation performed on the socket is transmitted to the virtual machine.

In this manner, an application in the virtual machine invokes a socket API to operate the created socket, and sends the control instruction for performing a control operation on the socket.

The virtual device multiplexer in the virtual machine receives the control instruction, and when receiving the control instruction, transmitted by the virtual machine, for performing a control operation on the socket, determines whether the virtual device used for data transmission is a virtual network interface card.

An exemplary implementation manner of determining whether the virtual device used for data transmission is a virtual network interface card is not further described herein. For details, reference may be made to the foregoing detailed description.

If it is determined that the virtual device used for data transmission is not a virtual NIC, the virtual device multiplexer sends the control instruction to the protocol stack offload apparatus in the virtual machine and the driver of the protocol stack offload apparatus.

The protocol stack offload apparatus in the virtual machine and the driver of the protocol stack offload apparatus transmit the received control instruction to the host protocol stack multiplexer.

The host protocol stack multiplexer determines, according to the stored correspondence between the socket and the identifier of the protocol stack instance in which the socket is created, the protocol stack instance corresponding to the protocol stack instance identifier corresponding to the socket in the control instruction, in the host, and performs, in the determined protocol stack instance of the host, an operation on the socket according to the received control instruction; and transmits an operation result of the operation performed on the socket to the protocol stack offload apparatus in the virtual machine and the driver of the protocol stack offload apparatus.

The protocol stack offload apparatus in the virtual machine and the driver of the protocol stack offload apparatus transmit the received operation result of the operation performed on the socket to the virtual device multiplexer in the virtual machine.

The virtual device multiplexer feeds back the operation result of the operation performed on the socket to an application process corresponding to the socket in the virtual machine.

If the control instruction for performing a control instruction on the socket is to transmit data between virtual machines based on the socket, in this case, the data to be transmitted between virtual machines based on the socket may be transmitted using the determined protocol stack instance to a protocol stack offload apparatus in a destination virtual machine, where the protocol stack offload apparatus in the virtual machine is configured to perform data transmission between the protocol stack instance and the virtual machine.

If it is necessary to transmit the operation result to other virtual machines in the same host, after obtaining the operation result of the operation performed on the socket, the host protocol stack multiplexer feeds back the obtained operation result to protocol stack offload apparatuses in the other virtual machines, and the protocol stack offload apparatuses in the other virtual machines transmit the operation result to corresponding application processes in the virtual machines.

An example is used for description. It is assumed that the virtual machine that sends the control instruction is a source virtual machine, and that other virtual machines are destination virtual machines. The source virtual machine and the destination virtual machines are disposed in the same host. If it is necessary to transmit the operation result of the protocol stack instance to a destination virtual machine instead of the source virtual machine, according to the technical solution provided by Embodiment 1 of the present disclosure, after obtaining the operation result of the operation performed on the socket, the host protocol stack multiplexer feeds back the obtained operation result to a protocol stack offload apparatus in the destination virtual machine, and the protocol stack offload apparatus in the destination virtual machine transmits the operation result to a corresponding application process in the virtual machine.

The foregoing process of operating the created socket is implemented on a premise that it is determined that the virtual device used for data transmission is not a virtual network interface card. When it is determined that the virtual device used for data transmission is a virtual network interface card, the process of operating the created socket is as follows.

If the virtual machine receives the control instruction for performing a control operation on the socket, and it is determined that the virtual device used for data transmission is a virtual NIC, in the determined protocol stack instance of the virtual machine corresponding to the virtual NIC, the operation is performed on the socket according to the control instruction, and the operation result is transmitted to the virtual device multiplexer in the virtual machine.

The virtual device multiplexer feeds back the operation result of the operation performed on the socket to an application process corresponding to the socket in the virtual machine.

Second manner includes perform a control operation on the socket created in the prior art.

An application in the virtual machine invokes a socket API to operate the created socket, and sends the control instruction for performing a control operation on the socket. In this manner, the created socket is not created according to the socket creation process provided by Embodiment 1 of the present disclosure, but is a socket obtained by performing processing and creation according to the prior art.

In this manner, except that forms of the socket on which a control operation is performed are different, other processes are the same as those in the first manner. Reference may be made to the detailed description in the first manner. Details are omitted herein.

In the two manners, the control operation performed on the created socket and feedback of the operation result to the application process in the virtual machine are described. In a virtualized environment, when a protocol stack in a virtual machine of the host is heavily loaded, the protocol stack may be associated with multiple protocol stack instances of the host simultaneously. Therefore, the process of performing a control operation on a socket may be completed by a protocol stack instance of the host, and multiple virtual machines may share the network protocol processing capability of the host, thereby avoiding a problem of poor system reliability when the protocol stack in the virtual machine becomes a bottleneck of the virtual machine in a case of heavy load of the protocol stack in the virtual machine. In addition, the protocol stack instance of the host may use a signal processor in the host to directly perform protocol processing to avoid a performance loss caused by signal processor simulation, device simulation, and the like.

The data processing of the virtual machine further includes data transmission. For example, a network event or a result of a control operation is reported to an application process.

The socket creation process includes two manners: one is the socket creation method provided by Embodiment 1 of the present disclosure, and the other is creating a socket in the prior art, that is, not using the socket creation method provided by Embodiment 1 of the present disclosure. Based on this, the data transmission process may also include two manners: one is the process of performing data transmission based on the created socket, which is provided by Embodiment 1 of the present disclosure, and the other is a process of performing data transmission based on the socket in the prior art. The two manners are described separately in the following.

First manner includes a process of performing data transmission based on the created socket, which is provided by Embodiment 1 of the present disclosure.

After the correspondence between the created socket and the identifier of the protocol stack instance in which the socket is created is sent to the virtual machine, when a data transmission instruction for transmitting data received by the protocol stack instance to the application process corresponding to the socket is received, the identifier of the protocol stack instance corresponding to the socket in the data transmission instruction is determined according to the stored correspondence between the socket and the identifier of the protocol stack instance; and the data received by the protocol stack instance is transmitted, using the protocol stack instance corresponding to the determined protocol stack instance identifier, to the application process corresponding to the socket in the virtual machine.

The data received by the protocol stack instance is at least one of the following types.

First type includes a processing result of processing the received data by the protocol stack instance.

Second type includes a processing result of processing the received data by the protocol stack instance of the virtual machine, which is received by the protocol stack instance.

Third type includes data transmitted between different virtual machines in the same host and received by the protocol stack instance.

The data is transmitted to the protocol stack instance of the host. For example, the network event or other data is transmitted to a protocol stack instance of the host.

The host protocol stack multiplexer obtains data in the protocol stack instance of the host, processes the obtained data, and needs to transmit the processed data to the application process corresponding to the socket in the virtual machine. The host protocol stack multiplexer determines, according to a stored correspondence between a socket and a protocol stack offload apparatus identifier, a protocol stack offload apparatus corresponding to the protocol stack offload apparatus identifier corresponding to the socket in the virtual machine, and transmits the received data to the determined protocol stack offload apparatus.

The protocol stack offload apparatus transmits the received data to the application process corresponding to the socket in the virtual machine.

Second manner includes a process of performing data transmission based on the created socket, which is provided in the prior art.

In this manner, except that forms of the socket are different, other processes are the same as those in the first manner. Reference may be made to the detailed description in the first manner. Details are omitted herein.

In the two manners, transmitting data to the application process in the virtual machine is described. In a virtualized environment, when a protocol stack in a virtual machine of the host is heavily loaded, the protocol stack may be associated with multiple protocol stack instances of the host simultaneously. Therefore, the data transmission process may be completed by a protocol stack instance of the host, and multiple virtual machines may share the network protocol processing capability of the host, thereby avoiding a problem of poor system reliability when the protocol stack in the virtual machine becomes a bottleneck of the virtual machine in a case of heavy load of the protocol stack in the virtual machine. In addition, the protocol stack instance may use a signal processor in the host to directly perform protocol processing to avoid a performance loss caused by signal processor simulation, device simulation, and the like.

According to the foregoing technical solution, when virtual machines in a same host perform communication with each other, in a manner of sharing a protocol stack instance of the host, firstly, the number of data copy times and processes of the protocol stack are reduced during data transmission between virtual machines in the same host, and system performance is further improved. A main reason is, in the prior art, when data is to be transmitted between virtual machines in the same host, as shown in the system structure shown in FIG. 1, when the data is transmitted between virtual machine #1 and virtual machine #3, it is necessary to copy the data to the protocol stack in virtual machine #1; then the data in the protocol stack in virtual machine #1 is copied to the virtual switch; then the data in the virtual switch is copied to the protocol stack in virtual machine #3; finally, the data in the protocol stack in virtual machine #3 is copied to the application corresponding to virtual machine #3. Four data copy times and two protocol processes are required in total. However, using the technical solution provided by Embodiment 1 of the present disclosure, when data is transmitted between virtual machine #1 and virtual machine #3, as shown in the system structure shown in FIG. 2A, it is only necessary to transmit the data in virtual machine #1 to the protocol stack instance of the host, and then transmit the data in the protocol stack instance of the host to the application corresponding to virtual machine #3. That is, the data is copied by the virtual machine to the host, and after being processed, is copied to the destination virtual machine. If protocol processing is not required for the data, protocol processing may not be performed, and the data is directly copied to the destination virtual machine. The number of data copy times and processes of the protocol stack are reduced, and system performance is further improved.

Secondly, in a data transmission process, the number of virtual interrupts is reduced, and burden of interrupt processing is reduced. For example, for an application based on the TCP, because the TCP-based application is a stream-oriented application, multiple small data packets may be combined into a large data packet; using the protocol stack instance of the host provided by Embodiment 1 of the present disclosure, some data packets after being combined are reported to the protocol stack offload apparatus of the virtual machine in an interrupt manner. In this way, multiple interrupts caused by multiple small data packets may be avoided, and load caused by interrupt processing is mitigated.

The technical solution provided by Embodiment 1 of the present disclosure is described in detail using the system structure shown in FIG. 2A. In illustrative implementation, the system structures shown in FIG. 2B and FIG. 2C may be further used to implement the technical solution provided by Embodiment 1 of the present disclosure.

If the system structure shown in FIG. 2B is used to implement the technical solution provided by Embodiment 1 of the present disclosure, a function of the virtual device multiplexer in the virtual machine provided in FIG. 2A may be implemented by modifying an API interface. For example, a standard socket API interface may be modified to integrate the function of the virtual device multiplexer for sensing the virtual network and the virtual protocol stack offload apparatus in the virtual machine. An interface for selecting a virtual device may be provided for an application, as shown by a solid-line path in virtual machine #2 in FIG. 2B. By modifying the standard interface, a virtual direct link between different virtual machines in the same host may also be established, where the link directly passes through the host protocol stack multiplexer without passing through the protocol stack instance, and is implemented in a memory copy or mapping manner, as shown by a dashed-line transmission path shown in FIG. 2B. Alternatively, the standard socket API interface may also not be modified, but the function of the virtual device multiplexer is integrated during implementation of the API, and an operation of selecting a virtual device is not sensed by the application. Except this, the data processing of the virtual machine is basically the same as that in the system structure shown in FIG. 2A, and is not further described herein.

If the system structure shown in FIG. 2C is used to implement the technical solution provided by Embodiment 1 of the present disclosure, a virtual switch is added in the system structure shown in FIG. 2A. The host protocol stack multiplexer may select whether to connect to the virtual switch, to support data sending and receiving between a host software layer and a virtual machine. A protocol stack instance of the host and a virtual NIC may access different ports of the same virtual switch in a hybrid manner. Except this, the data processing of the virtual machine is the same as that in the system structure shown in FIG. 2A, and is not further described herein.

Embodiment 2

The embodiment of the present disclosure provides a method for selecting a protocol stack. Data processing performed by a virtual machine mainly includes socket creation, a control operation on the created socket, and data transmission, which are described separately in the following. At least one virtual machine is disposed in a host, and at least one protocol stack instance having a protocol processing function is created in the host. The virtual machine uses the protocol processing function of the at least one protocol stack instance.

Figure 3:
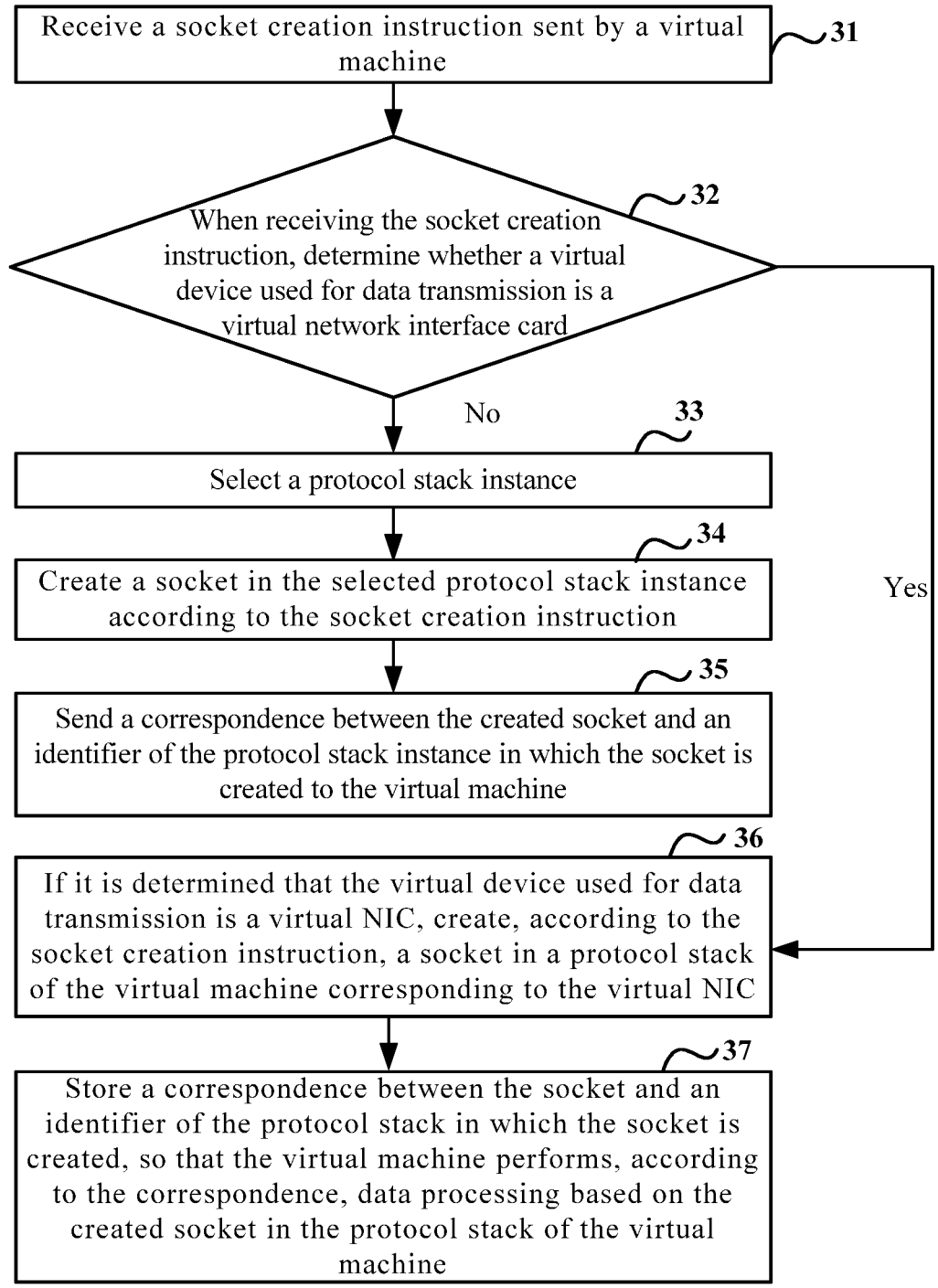
FIG. 3 is a flowchart of a method for selecting a protocol stack according to Embodiment 2 of the present disclosure.

FIG. 3 shows a socket creation process provided by the embodiment of the present disclosure, and the specific process is as follows.

Step 31: Receive a socket creation instruction sent by a virtual machine.

An application in the virtual machine invokes a socket API to create a socket, and sends a socket creation instruction for socket creation. The socket creation instruction includes information about socket creation.

The information about socket creation includes triplet or quintet information. For details, reference may be made to the detailed description in Embodiment 1, which is not described in this step again.

Step 32: When receiving the socket creation instruction, determine whether a virtual device used for data transmission is a virtual network interface card. If a determining result is no, step 33 is performed; if a determining result is yes, step 36 is performed.

A specific implementation manner of determining whether the virtual device used for data transmission is a virtual network interface card is not further described in Embodiment 2 of the present disclosure. For details, reference may be made to the detailed description in Embodiment 1.

Step 32 is an optional execution process. During specific implementation, step 32 may not be performed and step 33 is performed directly.

Step 33: Select a protocol stack instance.

A protocol stack instance is selected from at least one protocol stack instance of a host.

In this case, when it is determined that the virtual device used for data transmission is not a virtual NIC, a protocol stack instance is selected from at least one protocol stack instance of the host. The specific process of selecting a protocol stack instance is not further described in Embodiment 2 of the present disclosure. For details, reference may be made to the detailed description in Embodiment 1.

Step 34: Create a socket in the selected protocol stack instance according to the socket creation instruction.

Step 35: Send a correspondence between the created socket and an identifier of the protocol stack instance in which the socket is created to the virtual machine, so that the virtual machine performs data processing based on the created socket in the selected protocol stack instance.

Step 36: If it is determined that the virtual device used for data transmission is a virtual NIC, create, according to the socket creation instruction, a socket in a protocol stack instance of the virtual machine corresponding to the virtual NIC.

Step 37: Store a correspondence between the socket and an identifier of the protocol stack instance in which the socket is created, so that the virtual machine performs, according to the correspondence, data processing based on the created socket in the protocol stack instance of the virtual machine.

In the foregoing socket creation process, in a virtualized environment, when a protocol stack in a virtual machine of the host is heavily loaded, the protocol stack may be associated with multiple protocol stack instances of the host simultaneously. Therefore, the socket creation process may be completed by the protocol stack instance of the host, and multiple virtual machines may share a network protocol processing capability of the host, thereby avoiding a problem of poor system reliability when the protocol stack in the virtual machine becomes a bottleneck of the virtual machine in a case of heavy load of the protocol stack in the virtual machine. In addition, the protocol stack instance may use a signal processor in the host to directly perform protocol processing to avoid a performance loss caused by signal processor simulation, device simulation, and the like.

Data processing performed by the virtual machine further includes a control operation on the created socket. Control operations include operations such as bind, listen, connect, and close, and may further include data receiving and data sending operations such as receive and send.

Figure 4:
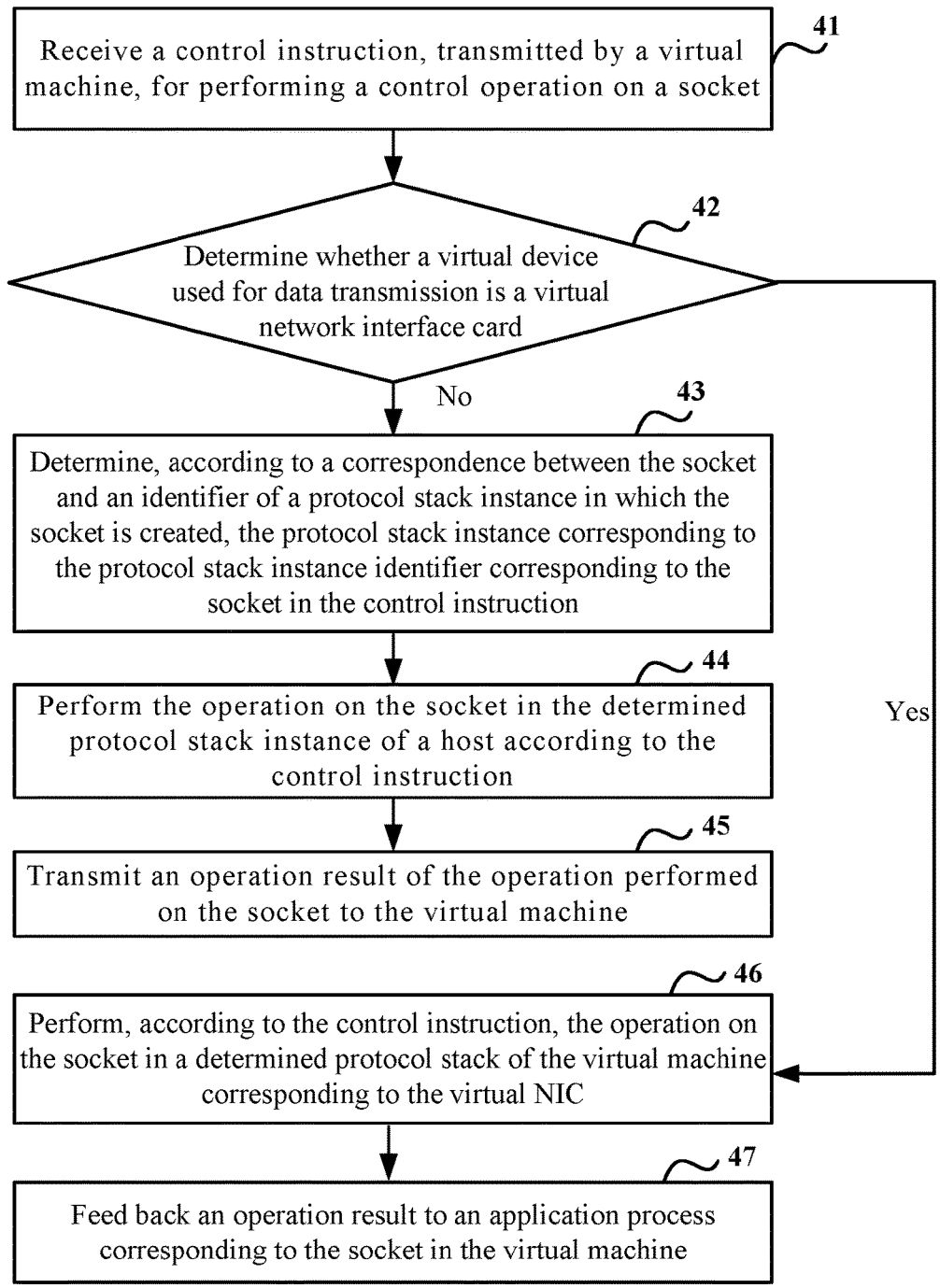
FIG. 4 is a flowchart of a method for selecting a protocol stack according to Embodiment 2 of the present disclosure.

The socket creation process includes two manners: one is the foregoing socket creation method provided by Embodiment 2 of the present disclosure, and the other is creating a socket in the prior art, that is, not using the foregoing socket creation method provided by Embodiment 2 of the present disclosure. Based on this, the process of performing a control operation on the created socket may also include two manners: one is a process of performing a control operation on the foregoing socket created in Embodiment 2 of the present disclosure, and the other is performing a control operation on the socket created in the prior art. The only difference between the two manners lies in a socket form, but the processes of performing a control operation on the socket are the same. After the correspondence between the created socket and the identifier of the protocol stack instance in which the socket is created is transmitted to the virtual machine that sends the socket creation instruction, as shown in FIG. 4, the specific process is as follows.

Step 41: Receive a control instruction, transmitted by the virtual machine, for performing a control operation on the socket.

An application in the virtual machine invokes a socket API to operate the created socket, and sends the control instruction for performing a control operation on the socket.

Step 42: Determine whether the virtual device used for data transmission is a virtual network interface card. If a determining result is no, step 43 is performed, or otherwise, step 46 is performed.

A specific implementation manner of determining whether the virtual device used for data transmission is a virtual network interface card is not further described in Embodiment 2 of the present disclosure. For details, reference may be made to the detailed description in Embodiment 1.

Step 42 is an optional step. In specific implementation, step 43 may be performed directly without determining the virtual device.

Step 43: If it is determined that the virtual device used for data transmission is not a NIC, determine, according to the correspondence between the socket and the identifier of the protocol stack instance in which the socket is created, the protocol stack instance corresponding to the protocol stack instance identifier corresponding to the socket in the control instruction.

Step 44: Perform the operation on the socket in the determined protocol stack instance of the host according to the control instruction.

Step 45: Transmit an operation result of the operation performed on the socket to the virtual machine.

The operation result of the operation performed on the socket may be transmitted to an application process corresponding to the socket in the virtual machine.

The control instruction for performing a control instruction on the socket is to transmit data between virtual machines based on the socket; the data to be transmitted between virtual machines based on the socket is transmitted using the determined protocol stack instance to a protocol stack offload apparatus in a destination virtual machine, where the protocol stack offload apparatus in the virtual machine is a virtual device configured to transmit data between the protocol stack instance and the virtual machine.

An example is used for description. It is assumed that the virtual machine that sends the control instruction is a source virtual machine, and that other virtual machines are destination virtual machines. The source virtual machine and the destination virtual machines are disposed in the same host. If it is necessary to transmit the operation result to a destination virtual machine instead of a source virtual machine, according to the technical solution provided by Embodiment 1 of the present disclosure, after obtaining the operation result of the operation performed on the socket, a host protocol stack multiplexer feeds back the obtained operation result to a protocol stack offload apparatus in the destination virtual machine, and the protocol stack offload apparatus in the destination virtual machine transmits the operation result to a corresponding application process in the virtual machine.

Step 46: If it is determined that the virtual device used for data transmission is a virtual NIC, perform, according to the control instruction, the operation on the socket in the determined protocol stack instance of the virtual machine corresponding to the virtual NIC.

Step 47: Feed back an operation result to the application process corresponding to the socket in the virtual machine.

The execution process of step 41 to step 47 may be used as an independent process for performing a control operation on the socket, or step 41 to step 47 may be performed in sequence after step 35 in which the correspondence between the created socket and the identifier of the protocol stack instance that creates the socket is transmitted to the virtual machine that sends the socket creation instruction.

In step 41 to step 47, the control operation performed on the created socket and feedback of the operation result to the application process in the virtual machine are described. In a virtualized environment, when a protocol stack in a virtual machine of the host is heavily loaded, the protocol stack may be associated with multiple protocol stack instances of the host simultaneously. Therefore, the process of performing a control operation on a socket may be completed by a protocol stack instance of the host, and multiple virtual machines may share the network protocol processing capability of the host, thereby avoiding a problem of poor system reliability when the protocol stack in the virtual machine becomes a bottleneck of the virtual machine in a case of heavy load of the protocol stack in the virtual machine. In addition, the protocol stack instance may use a signal processor in the host to directly perform protocol processing to avoid a performance loss caused by signal processor simulation, device simulation, and the like.

The data processing of the virtual machine further includes data transmission. For example, a network event or a result of a control operation is reported to an application process.

Figure 5:
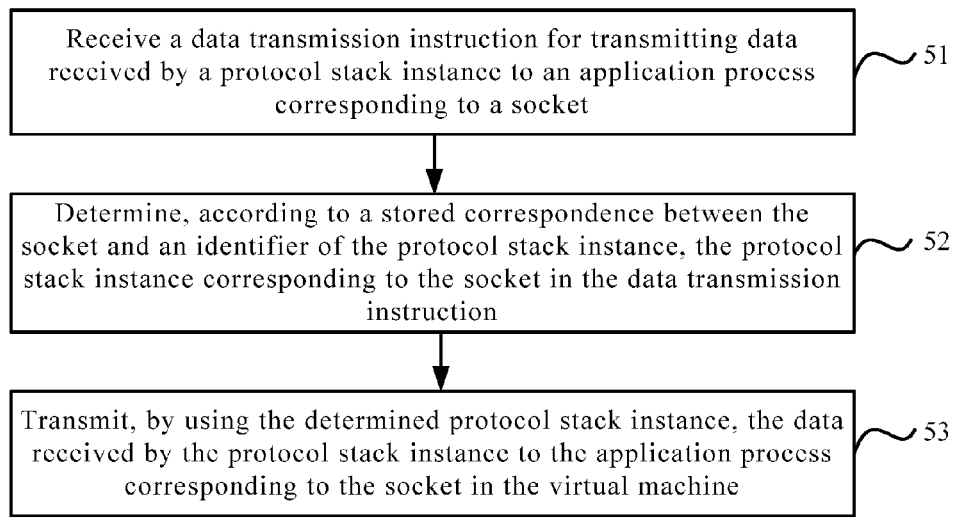
FIG. 5 is a flowchart of a method for selecting a protocol stack according to Embodiment 2 of the present disclosure.

The socket creation process includes two manners: one is the foregoing socket creation method provided by Embodiment 1 of the present disclosure, and the other is creating a socket in the prior art, that is, not using the foregoing socket creation method provided by Embodiment 1 of the present disclosure. Based on this, the data transmission process may also include two manners: one is the process of performing data transmission based on the foregoing socket created in Embodiment 1 of the present disclosure, and the other is a process of performing data transmission based on the socket in the prior art. The only difference between the two manners lies in a socket form, but the processes of performing data transmission based on the socket are the same. As shown in FIG. 5, the specific process is as follows.

Step 51: Receive a data transmission instruction for transmitting data received by the protocol stack instance to the application process corresponding to the socket.

The received data is at least one of the following types:

First type: a processing result of processing the received data by the protocol stack instance.

Second type: a processing result of processing the received data by the protocol stack in the virtual machine, which is received by the protocol stack instance.

Third type: data transmitted between different virtual machines in the same host and received by the protocol stack instance.

Step 52: Determine, according to the stored correspondence between the socket and the identifier of the protocol stack instance, the protocol stack instance corresponding to the socket in the data transmission instruction.

Step 53: Transmit, using the determined protocol stack instance, the data received by the protocol stack instance to the application process corresponding to the socket in the virtual machine.

The received data may be transmitted to the protocol stack offload apparatus using the protocol stack instance, and is transmitted by the protocol stack offload apparatus to the application process corresponding to the socket in the virtual machine.

In a virtualized environment, when a protocol stack in a virtual machine of the host is heavily loaded, the protocol stack may be associated with multiple protocol stack instances of the host simultaneously. Therefore, the data transmission process may be completed by a protocol stack instance of the host, and multiple virtual machines may share the network protocol processing capability of the host, thereby avoiding a problem of poor system reliability when the protocol stack in the virtual machine becomes a bottleneck of the virtual machine in a case of heavy load of the protocol stack in the virtual machine. In addition, the protocol stack instance may use a signal processor in the host to directly perform protocol processing to avoid a performance loss caused by signal processor simulation, device simulation, and the like.

According to the foregoing technical solution, when virtual machines in a same host perform communication with each other, in a manner of sharing a protocol stack instance of the host, firstly, the number of data copy times and processes of the protocol stack are reduced during data transmission between virtual machines in the same host, and system performance is further improved. A main reason is, in the prior art, when data is to be transmitted between virtual machines in the same host, as shown in the system structure shown in FIG. 1, when the data is to be transmitted between virtual machine #1 and virtual machine #3, it is necessary to copy the data to the protocol stack in virtual machine #1; then the data in the protocol stack in virtual machine #1 is copied to the virtual switch; then the data in the virtual switch is copied to the protocol stack in virtual machine #3; finally, the data in the protocol stack in virtual machine #3 is copied to the application corresponding to virtual machine #3. Four data copy times and two protocol processes are required in total. According to the technical solution provided by Embodiment 1 of the present disclosure, when data is transmitted between virtual machine #1 and virtual machine #3, as shown in the system structure shown in FIG. 2A, it is only necessary to transmit the data in virtual machine #1 to the protocol stack instance of the host, and then transmit the data in the protocol stack instance of the host to the application corresponding to virtual machine #3. That is, the data is copied by the virtual machine to the host, and after being processed, is copied to the destination virtual machine. If protocol processing is not required for the data, protocol processing may not be performed, and the data is directly copied to the destination virtual machine. The number of data copy times and processes of the protocol stack are reduced, and system performance is further improved.

Secondly, in a data transmission process, the number of virtual interrupts is reduced, and burden of interrupt processing is reduced. For example, for an application based on the TCP, because the TCP-based application is a stream-oriented application, multiple small data packets may be combined into a large data packet; using the protocol stack instance of the host provided by Embodiment 1 of the present disclosure, some data packets after being combined are reported to the protocol stack offload apparatus of the virtual machine in an interrupt manner. In this way, multiple interrupts caused by multiple small data packets may be avoided, and load caused by interrupt processing is mitigated.

Figure 6A:
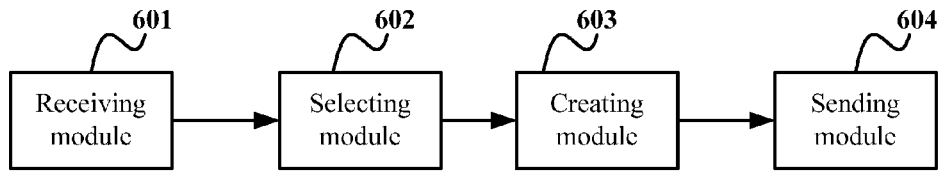
FIG. 6A is a schematic diagram of a structure of an apparatus for selecting a protocol stack according to Embodiment 2 of the present disclosure.

Correspondingly, Embodiment 2 of the present disclosure further provides an apparatus for selecting a protocol stack. As shown in FIG. 6a, a specific structure is as follows.

A receiving module 601 is configured to receive a socket creation instruction sent by a virtual machine, and transmit the socket creation instruction to a selecting module 602.

The selecting module 602 is configured to select a protocol stack instance.

The selecting module 602 is configured to select a protocol stack instance according to at least one of the following manners: selecting a protocol stack instance from at least one protocol stack instance of a host according to a load balance principle; determining an application process corresponding to the socket to be created according to the socket creation instruction, determining a service feature of the application process according to historical information about socket creation of the application process, and selecting a protocol stack instance from at least one protocol stack instance of the host according to the service feature of the application process; selecting a protocol stack instance from at least one protocol stack instance of the host according to a prestored correspondence between a virtual machine identifier and a protocol stack instance identifier; and selecting a protocol stack instance from at least one protocol stack instance of the host according to attribute information of the socket to be created according to the socket creation instruction.

A creating module 603 is configured to create, according to the socket creation instruction, a socket in the protocol stack instance selected by the selecting module 602, and transmit the created socket to a sending module 604.

The sending module 604 is configured to send a correspondence between the created socket and an identifier of the protocol stack instance to the virtual machine, so that the virtual machine performs, according to the correspondence, data processing based on the created socket in the protocol stack instance.

Optionally, the apparatus may further include a first determining module configured to determine, according to one of the following manners, that a virtual device used for data transmission is not a virtual network interface card NIC; determining, according to a static designation manner, that the virtual device used for data transmission is not a virtual NIC; determining an application process corresponding to the socket to be created according to the socket creation instruction, determining a service feature of the application process according to historical information about socket creation of the application process, and determining, according to the service feature of the application process, that the virtual device used for data transmission is not a virtual NIC; and determining, according to attribute information of the socket to be created according to the socket creation instruction, that the virtual device used for data transmission is not a virtual NIC.

The receiving module 601 is further configured to receive a control instruction, transmitted by the virtual machine, for performing a control operation on the socket.

The apparatus may further include a second determining module configured to determine, according to the correspondence between the socket and the identifier of the protocol stack instance, the protocol stack instance corresponding to the socket in the control instruction.

The creating module 603 is further configured to perform, in the protocol stack instance determined by the second determining module, the operation on the socket according to the control instruction.

The sending module 604 is further configured to transmit an operation result of the operation performed on the socket to the virtual machine.

If the control instruction is to transmit data between virtual machines based on the socket, that the creating module 603 is configured to perform, in the protocol stack instance, the operation on the socket according to the control instruction is the creating module is configured to transmit, using the protocol stack instance, the data to be transmitted between virtual machines based on the socket, to a protocol stack offload apparatus in a destination virtual machine, where the protocol stack offload apparatus in the virtual machine is configured to perform data transmission between the protocol stack instance and the virtual machine.

Optionally, the creating module 603 is further configured to determine that the virtual device used for data transmission is not a virtual network interface card NIC.

Optionally, the receiving module 601 is further configured to receive a data transmission instruction for transmitting data received by the protocol stack instance to the application process corresponding to the socket; and the selecting module is further configured to determine, according to the stored correspondence between the socket and the identifier of the protocol stack instance, the protocol stack instance corresponding to the socket in the data transmission instruction.

The sending module 604 is further configured to transmit, using the protocol stack instance, the data received by the protocol stack instance to the application process corresponding to the socket in the virtual machine.

Figure 6B:
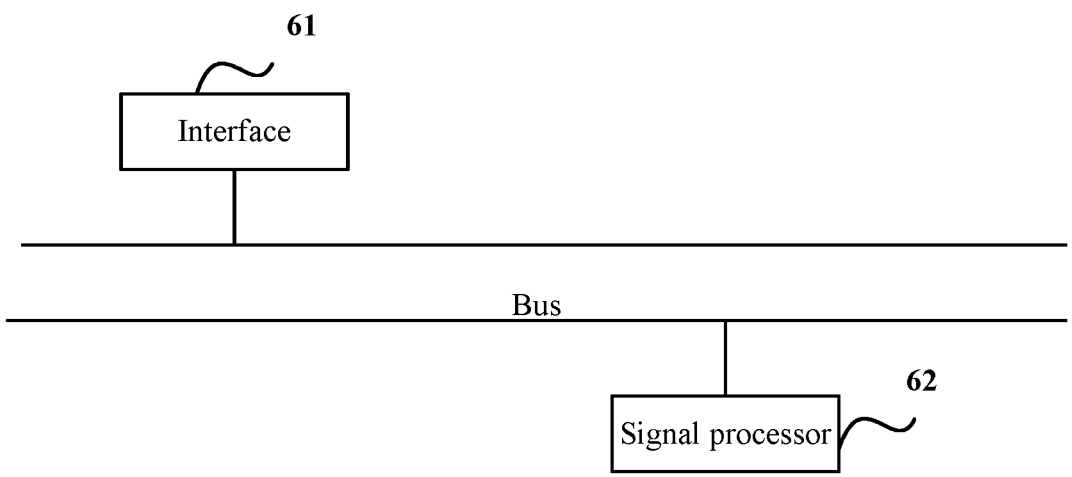
FIG. 6B is a schematic diagram of a structure of a device for selecting a protocol stack according to Embodiment 2 of the present disclosure.

Correspondingly, Embodiment 2 of the present disclosure further provides a device for selecting a protocol stack. As shown in FIG. 6b, a specific structure of the device includes an interface 61 and a signal processor 62, where the interface 61 is connected to the signal processor 62 by a bus, and configured to transmit data.

The interface 61 is configured to receive a socket creation instruction sent by a virtual machine, and transmit the socket creation instruction to the signal processor 62.

The signal processor 62 is configured to select a protocol stack instance.

The signal processor 62 is configured to select a protocol stack instance according to at least one of the following manners selecting a protocol stack instance from at least one protocol stack instance of a host according to a load balance principle; determining an application process corresponding to a socket to be created according to the socket creation instruction, determining a service feature of the application process according to historical information about socket creation of the application process, and selecting a protocol stack instance from at least one protocol stack instance of the host according to the service feature of the application process; selecting a protocol stack instance from at least one protocol stack instance of the host according to a prestored correspondence between a virtual machine identifier and a protocol stack instance identifier; and selecting a protocol stack instance from at least one protocol stack instance of the host according to attribute information of the socket to be created according to the socket creation instruction.

The signal processor 62 is further configured to create the socket in the selected protocol stack instance according to the socket creation instruction, and transmit the created socket to the interface 61.

The interface 61 is configured to send a correspondence between the created socket and an identifier of the protocol stack instance to the virtual machine, so that the virtual machine performs, according to the correspondence, data processing based on the created socket in the protocol stack instance.

Optionally, the signal processor 62 is configured to determine, according to one of the following manners, that a virtual device used for data transmission is not a virtual network interface card NIC. Determining, according to a static designation manner, that the virtual device used for data transmission is not a virtual NIC; determining an application process corresponding to the socket to be created according to the socket creation instruction, determining a service feature of the application process according to historical information about socket creation of the application process, and determining, according to the service feature of the application process, that the virtual device used for data transmission is not a virtual NIC; and determining, according to attribute information of the socket to be created according to the socket creation instruction, that the virtual device used for data transmission is not a virtual NIC.

The interface 61 is further configured to receive a control instruction, transmitted by the virtual machine, for performing a control operation on the socket.

The signal processor 62 is further configured to determine, according to the correspondence between the socket and the identifier of the protocol stack instance, the protocol stack instance corresponding to the socket in the control instruction.

The signal processor 62 is further configured to perform, in the protocol stack instance determined by the signal processor 62, the operation on the socket according to the control instruction.

The interface 61 is further configured to transmit an operation result of the operation performed on the socket to the virtual machine.

If the control instruction is to transmit data between virtual machines based on the socket, that the signal processor 62 is configured to perform, in the protocol stack instance, the operation on the socket according to the control instruction is the signal processor is configured to transmit, using the protocol stack instance, the data to be transmitted between virtual machines based on the socket, to a protocol stack offload apparatus in a destination virtual machine, where the protocol stack offload apparatus in the virtual machine is configured to perform data transmission between the protocol stack instance and the virtual machine.

Optionally, the signal processor 62 is further configured to determine that the virtual device used for data transmission is not a virtual network interface card NIC.

Optionally, the interface 61 is further configured to receive a data transmission instruction for transmitting data received by the protocol stack instance to the application process corresponding to the socket; and the selecting module is further configured to determine, according to the stored correspondence between the socket and the identifier of the protocol stack instance, the protocol stack instance corresponding to the socket in the data transmission instruction.

The interface 61 is further configured to transmit, using the protocol stack instance, the data received by the protocol stack instance to the application process corresponding to the socket in the virtual machine.

Persons skilled in the art should understand that the embodiments of the present disclosure may be provided as a method, an apparatus, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disk read-only memory, an optical memory, and the like) that include computer-usable program code.

The present disclosure is described with reference to the flowcharts and/or block diagrams of the method, the apparatus, and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

What is claimed is:

1. A method, performed by a computing device hosting a first virtual machine, the computing device configured with a hypervisor for managing the first virtual machine, the method comprising:
receiving, by the hypervisor from the first virtual machine, a socket creation instruction to create a first socket;
selecting a first protocol stack instance from a plurality of protocol stack instances in the hypervisor of the computing device according to a prestored correspondence between a virtual machine identifier and a protocol stack instance identifier;
creating the first socket in the first protocol stack instance according to the socket creation instruction;
sending a correspondence between the first socket and an identifier of the first protocol stack instance in the hypervisor to the first virtual machine; and
performing, according to the correspondence, data processing for the first virtual machine based on the first socket in the first protocol stack instance in the hypervisor.

2. The method according to claim 1, wherein the computing device further hosts a second virtual machine, and the method further comprising performing a protocol processing function for data of the second virtual machine using the first protocol stack instance such that the first protocol stack instance is used to perform one or more data encapsulation functions for both the first virtual machine and the second virtual machine.

3. The method according to claim 2, further comprising:
receiving a first data transmission instruction for transmitting data to the second virtual machine based on the first socket; and
transmitting, using the first protocol stack instance, the data to be transmitted to the second virtual machine based on the first socket to a protocol stack offload apparatus in the second virtual machine, the protocol stack offload apparatus in the second virtual machine being configured to perform data transmission between the first protocol stack instance and the second virtual machine and further configured to transmit the data to an application process in the second virtual machine.

4. The method according to claim 1, wherein selecting the first protocol stack instance from the plurality of protocol stack instances provided by the computing device comprises selecting the first protocol stack instance from the plurality of protocol stack instances according to a load balance principle.

5. The method according to claim 1, wherein selecting the first protocol stack instance from the plurality of protocol stack instances in the hypervisor comprises:

determining an application process corresponding to the first socket according to the socket creation instruction;

determining a service feature of the application process according to historical information about socket creation of the application process; and selecting the first protocol stack instance from the plurality of protocol stack instances according to the service feature of the application process.

6. The method according to claim 1, wherein selecting the first protocol stack instance from the plurality of protocol stack instances in the hypervisor comprises selecting the first protocol stack instance from the plurality of protocol stack instances according to attribute information of the first socket according to the socket creation instruction.

7. The method according to claim 1, wherein after sending the correspondence between the first socket and the identifier of the first protocol stack instance to the first virtual machine, the method further comprises:

receiving, by the hypervisor from the first virtual machine, a control instruction for performing a control operation on the first socket;

determining, according to the correspondence between the first socket and the identifier of the first protocol stack instance, the first protocol stack instance corresponding to the first socket;

performing the control operation on the first socket in the first protocol stack instance in the hypervisor according to the control instruction; and transmitting, from the hypervisor to the first virtual machine, an operation result of the control operation performed on the first socket according to the control instruction from the first virtual machine.

8. A computing device for hosting a first virtual machine and a second virtual machine, the computing device comprising:

a non-transitory computer readable storage medium having stored thereon computer-executable instructions for the first virtual machine and a hypervisor for managing the first virtual machine; and a processor coupled to the non-transitory computer readable storage medium, the instructions causing the processor to be configured to:

send, from the first virtual machine to the hypervisor, a socket creation instruction so as to create a first socket;

receive the socket creation instruction from the first virtual machine;

determine an application process corresponding to the socket creation instruction;

determine a service feature of the application process according to historical information about socket creation of the application process;

select, according to the service feature of the application process, a first protocol stack instance from a plurality of protocol stack instances provided by the computing device;

create the first socket in the first protocol stack instance according to the socket creation instruction;

send a correspondence between the first socket and an identifier of the first protocol stack instance to the first virtual machine; and perform, according to the correspondence, data processing based on the first socket in the first protocol stack instance for the first virtual machine.

9. The computing device according to claim 8, wherein the computing device further hosts the second virtual machine, and the first protocol stack instance being provided a protocol processing function so as to process data of the second virtual machine.

10. The computing device according to claim 9, wherein the instructions further cause the processor to be configured to:

receive a first data transmission instruction for transmitting data to the second virtual machine based on the first socket; and transmit, using the first protocol stack instance, the data to be transmitted to the second virtual machine based on the first socket to a protocol stack offload apparatus in the second virtual machine, the protocol stack offload apparatus in the second virtual machine being configured to:

perform data transmission between the first protocol stack instance and the second virtual machine; and transmit the data to an application process in the second virtual machine.

11. The computing device according to claim 8, wherein the instructions further cause the processor to be configured to determine that a virtual device used for data transmission is not a virtual network interface card (NIC) of the first virtual machine.

12. The computing device according to claim 8, wherein the instructions further cause the processor to be configured to determine, according to the service feature of the application process, that a virtual device used for data transmission is not a virtual network interface card (NIC) of the first virtual machine.

13. The computing device according to claim 8, wherein the instructions further cause the processor to be configured to determine, according to attribute information of the first socket according to the socket creation instruction, that a virtual device used for data transmission is not a virtual network interface card (NIC) of the first virtual machine.

14. The computing device according to claim 8, wherein the instructions further cause the processor to be configured to:

receive, from the first virtual machine, a control instruction for performing a control operation on the first socket;

determine, according to the correspondence between the first socket and the identifier of the first protocol stack instance, the first protocol stack instance corresponding to the first socket in the control instruction;

perform the control operation on the first socket in the first protocol stack instance according to the control instruction; and transmit, from the hypervisor to the first virtual machine, an operation result of the control operation performed on the first socket according to the control instruction from the first virtual machine.

15. A method, performed by a computing device hosting a first virtual machine, the computing device being configured with a hypervisor so as to manage the first virtual machine, the method comprising:

receiving a socket creation instruction from the first virtual machine;

selecting, according to a prestored correspondence between a first identifier of the first virtual machine and a second identifier of a first protocol stack instance, the first protocol stack instance from a plurality of protocol stack instances provided by the computing device;

creating a first socket in the first protocol stack instance according to the socket creation instruction;

sending, to the first virtual machine, a correspondence relating the first socket and the identifier of the first protocol stack instance; and performing, according to the correspondence, data processing based on the first socket in the first protocol stack instance for the first virtual machine.

\* \* \* \* \*

UNITED STATES PATENT AND TRADEMARK OFFICE
CERTIFICATE OF CORRECTION

PATENT NO. : 10,127,067 B2
APPLICATION NO. : 15/139724
DATED : November 13, 2018
INVENTOR(S) : Qiang Gu and Liufei Wen Page 1 of 1

It is certified that error appears in the above-identified patent and that said Letters Patent is hereby corrected as shown below:

On the Title Page

Item (30), Line 1: "201310522423" should read "201310522423.5"

Page 2, Column 1, Item (56), U.S. PATENT DOCUMENTS, Line 6: "Sun" should read "SURI"

Signed and Sealed this
Twenty-fifth Day of December, 2018

Andrei Iancu
*Director of the United States Patent and Trademark Office*